(12) United States Patent
Myers

(10) Patent No.: US 8,752,290 B2
(45) Date of Patent: Jun. 17, 2014

(54) METHOD OF INSTALLING A LONGITUDINALLY OFFSET MULTI-LAYER MAT IN AN EXHAUST GAS AFTERTREATMENT OR ACOUSTIC DEVICE

(75) Inventor: Stephen J. Myers, Owosso, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 323 days.

(21) Appl. No.: 12/894,712

(22) Filed: Sep. 30, 2010

(65) Prior Publication Data

US 2012/0079697 A1    Apr. 5, 2012

(51) Int. Cl.
  B21D 51/16    (2006.01)
(52) U.S. Cl.
  USPC .............................................. 29/890; 422/179
(58) Field of Classification Search
  USPC .............................................. 29/890; 422/179
  See application file for complete search history.

(56) References Cited

U.S. PATENT DOCUMENTS

| | | | |
|---|---|---|---|
| 3,771,967 A | 11/1973 | Nowak | |
| 5,250,269 A | 10/1993 | Langer | |
| 5,926,954 A | 7/1999 | Wolf et al. | |
| 6,670,020 B1 | 12/2003 | Maus | |
| 7,179,429 B1 | 2/2007 | Maus | |
| 8,146,251 B2 * | 4/2012 | Kobayashi et al. | 29/890 |
| 2004/0022699 A1 | 2/2004 | Fukushima | |
| 2004/0255459 A1 | 12/2004 | Alles et al. | |
| 2007/0014707 A1 * | 1/2007 | Schultz et al. | 422/179 |
| 2009/0148356 A1 | 6/2009 | Okabe | |
| 2010/0236697 A1 | 9/2010 | Yoshimi et al. | |
| 2010/0239469 A1 | 9/2010 | Olivier et al. | |
| 2011/0185575 A1 | 8/2011 | Olivier et al. | |

FOREIGN PATENT DOCUMENTS

| | | |
|---|---|---|
| DE | 10205856 A1 | 8/2003 |
| DE | 102004056804 A1 | 6/2006 |
| DE | 102007058280 A1 | 6/2009 |
| EP | 0 192 417 A2 | 8/1986 |
| EP | 0 997 618 A2 | 5/2000 |
| EP | 1 772 600 A1 | 4/2007 |
| JP | 53046474 A | 4/1978 |
| JP | 8266905 A | 10/1996 |
| WO | 2007/047273 A2 | 4/2007 |

OTHER PUBLICATIONS

International Search Report and Written Opinion dated Sep. 16, 2011.

* cited by examiner

*Primary Examiner* — Richard Chang
(74) *Attorney, Agent, or Firm* — Wood, Phillips, Katz, Clark & Mortimer

(57) ABSTRACT

A method is provided for installing a multi-layer mat (24) in an exhaust gas aftertreatment or acoustic device. The method includes the steps of wrapping the mat (24) around an inner surface of the device along the same plane for at least a complete wrap around the inner surface; subsequently wrapping the mat (24) around the already completed wrap such that each of the successive wraps of the mat (24) are offset a constant distance from the plane of the previous wrap; a final wrap of the mat (24) wherein the mat is wrapped along a final plane for at least a complete wrap around the catalyst; and installing the mat (24) in the device (18) after the wrapping steps.

11 Claims, 6 Drawing Sheets

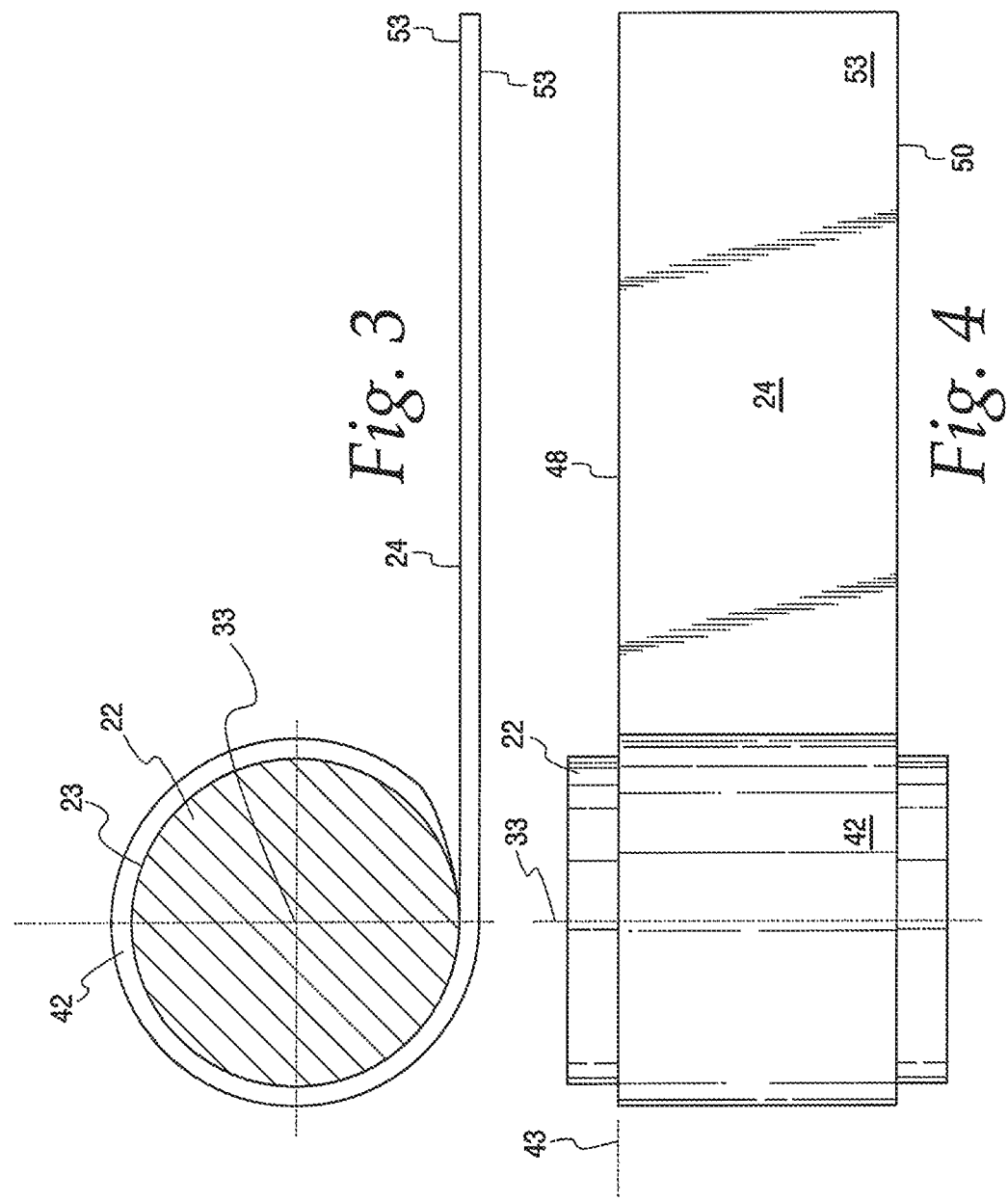

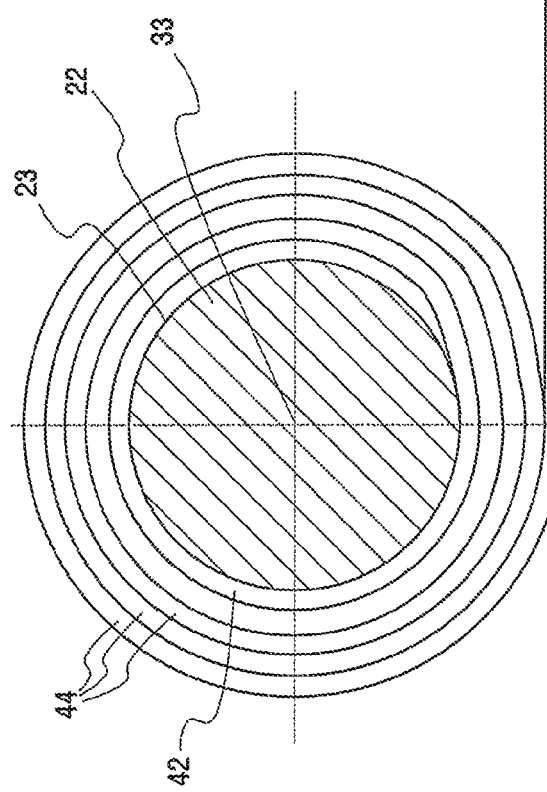
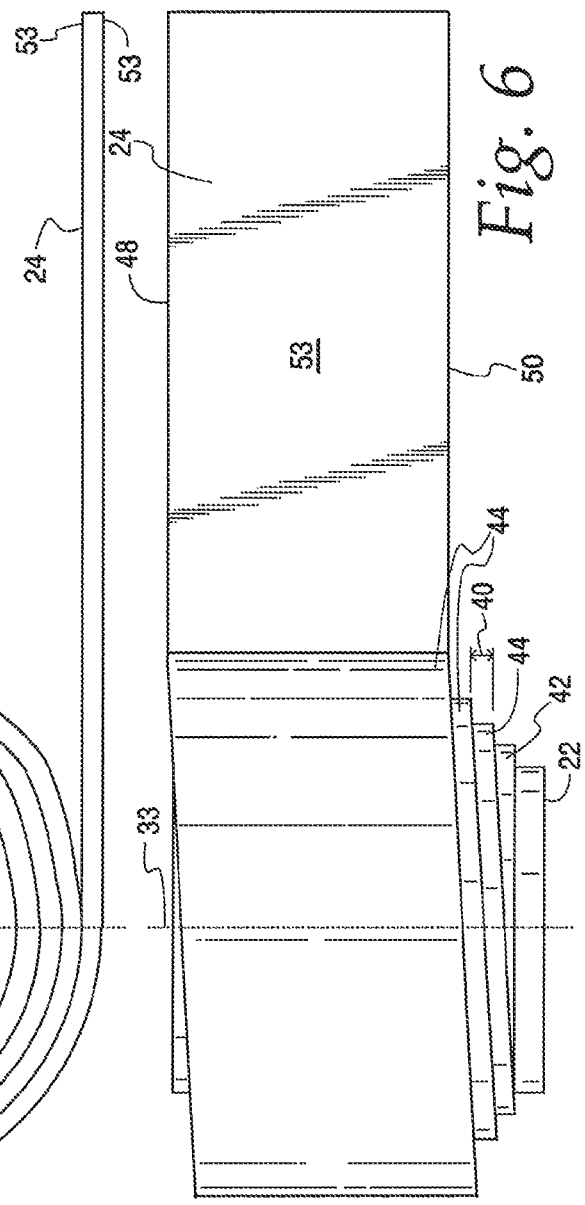

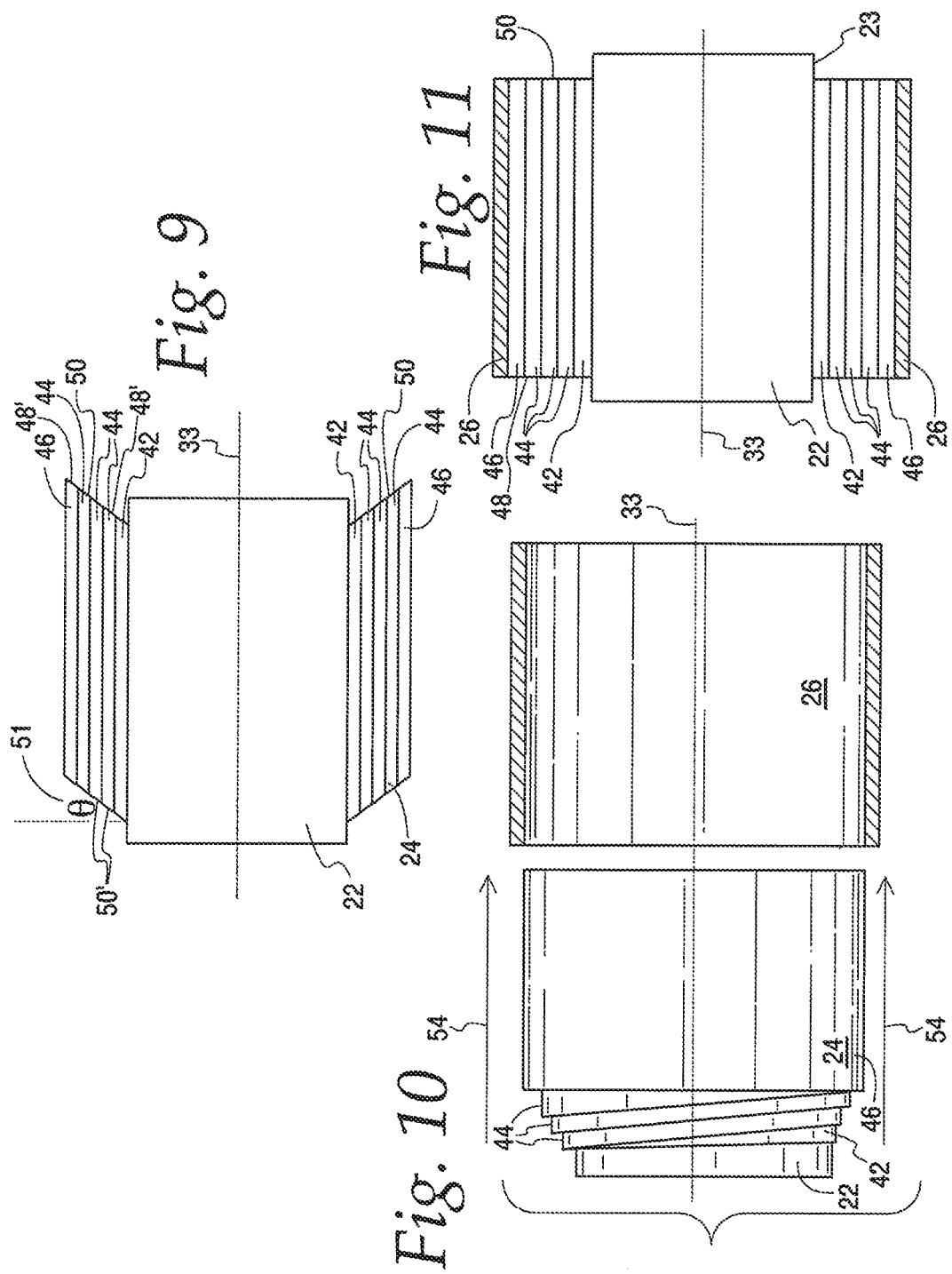

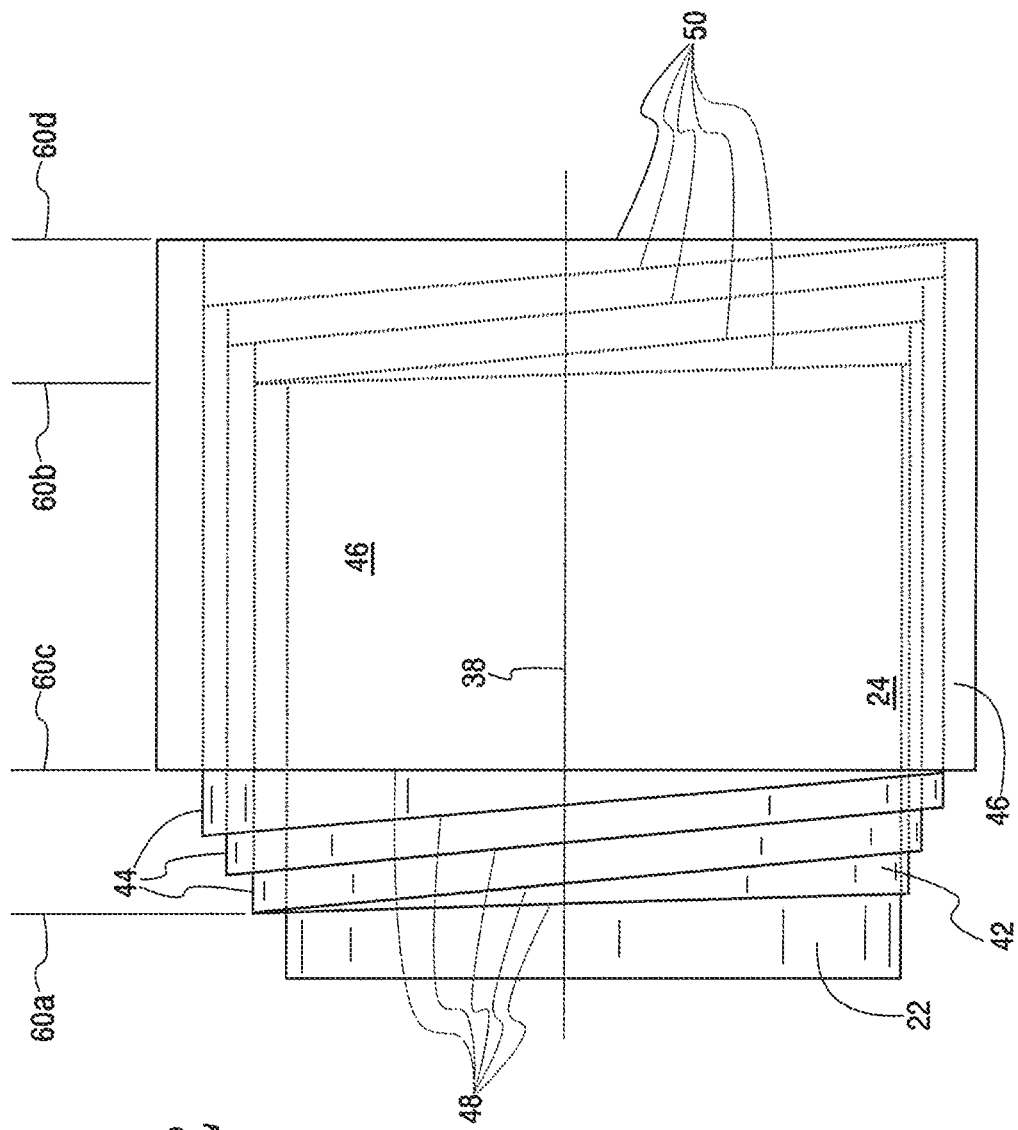

US 8,752,290 B2

METHOD OF INSTALLING A LONGITUDINALLY OFFSET MULTI-LAYER MAT IN AN EXHAUST GAS AFTERTREATMENT OR ACOUSTIC DEVICE

CROSS-REFERENCE TO RELATED APPLICATIONS

Not applicable.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to exhaust gas aftertreatment and/or acoustic systems and the devices used therein that utilize insulation blankets, batts and mats.

BACKGROUND OF THE INVENTION

Batts, blankets, and/or mats are utilized in exhaust gas systems in order to provide heat insulation and/or resilient mounting structure for acoustic and aftertreatment devices of the system to control the heat exchange to and from the devices and/or provide a protective mount for a core or other fragile component of the devices. It is known to place such batts/blankets/mats between adjacent wall surfaces of such devices with the material of the batts/blankets/mats being compressed to provide a desired installed density for the material to help maintain the batts/blankets/mats in a mounted position via frictional forces between the batts/blankets/mats and the adjacent wall surfaces. Typically, the adjacent wall surfaces are defined by a core or other internal component of the device and a can or housing that surrounds the core or other internal component with the batt/blanket/mat sandwiched between core/internal component and the can/housing.

Typically the batt/blanket/mat is wrapped around the core/internal component and the can/housing is installed by forcing the wrapped core/internal component into the can/housing causing the batt/blanket/mat to be sandwiched between the adjacent wall surfaces of the core/internal component and the can/housing. Often, during the installation process, the frictional forces holding the batt/blanket/mat in the mounted position cause the ends of the batt/blanket/mat to displace causing an unsupported corner of the batt/blanket/mat at the ends of the batt/blanket/mat. In addition, often times during the installation process, the frictional forces holding the batt/blanket/mat in the mounted position causes the edges of the batt/blanket/mat to displace such that the edges of the batt/blanket/mat are unsupported which may make the batt/blanket/mat susceptible to hot gas erosion.

SUMMARY OF THE INVENTION

In accordance with one feature of the invention, a method is provided for installing a mat within an exhaust gas aftertreatment or acoustic device having two adjacent surfaces. The method includes the steps of wrapping the mat around one of the two adjacent surfaces along the same plane for at least a complete wrap around the one of the two adjacent surfaces; subsequently wrapping the mat around the one of the two adjacent surfaces telescopically such that each successive wrap of the mat is offset a distance from the plane of the previous wrap; wrapping a final wrap of the mat wherein the mat is wrapped along a plane generally parallel to the plane of the first step for at least a complete wrap around the core; compressing the mat between the two adjacent surfaces of the device; wherein the compressing step comprises aligning the offset wraps of the mat as the offset wraps are translated relative to the other of the two adjacent surfaces.

According to one feature, the installing method includes installing a mat so that the mat is compressed between two adjacent surfaces of the device to achieve a desired predetermined mat profile.

According to one feature, the initial installing step includes maintaining the wrap in a constant position relative to the inner surface of the device as the mat is wrapped about the longitudinal axis of the device.

According to one feature, the subsequent installing step includes offsetting the mat a constant distance from the previous edge of the wrap as the mat is wrapped about the longitudinal axis of the device such that the mat is wrapped telescopically around the longitudinal axis.

According to one feature, the subsequent installing step includes maintaining the wrap in a constant position relative to the inner surface of the device as the mat is wrapped about the longitudinal axis.

In accordance with one feature of the invention, a method is provided for mounting a mat within an exhaust gas aftertreatment or acoustic device having an inner surface and an outer surface. The method comprises the steps of wrapping the mat about a longitudinal axis of the device so that the mat remains in a constant longitudinal position along the longitudinal axis; subsequently wrapping the mat about the longitudinal axis of the device telescopically such that each successive wrap of the mat is offset longitudinally from the previous wrap; thereafter wrapping the mat about the longitudinal axis of the device so that the mat remains in a constant longitudinal along the longitudinal axis; compressing the mat between the inner surface and the outer surface of the device.

BRIEF DESCRIPTION OF THE DRAWINGS

FIG. 3 is a side elevational view of the exhaust system component as a mat is wrapped pursuant to the invention;

FIG. 4 is a top plan view of the exhaust system component of FIG. 3 with one complete wrap of the map pursuant to the invention;

FIG. 5 is a side elevational view of the exhaust system component with subsequent offset wraps of the mat pursuant to the invention;

FIG. 6 is a top plan view of the exhaust system component of FIG. 5 with the subsequent offset wraps;

FIG. 9 is a longitudinal section view of the exhaust system component of FIG. 8 where the mat has been completely wrapped pursuant to the invention;

FIG. 10 is a side elevational view of the exhaust system component as a can/housing is installed pursuant to the invention; and FIG. 11 is a longitudinal section view of the exhaust system component after the can/housing is installed pursuant to the invention.

FIG. 12 is an enlarged view of the mat wrapped around the core as in FIG. 10, with the mat wraps shown in dashed lines (and the core omitted from the hidden lines on its right end to prevent clutter in the drawing).

DETAILED DESCRIPTION OF THE PREFERRED EMBODIMENT

Figure 1:
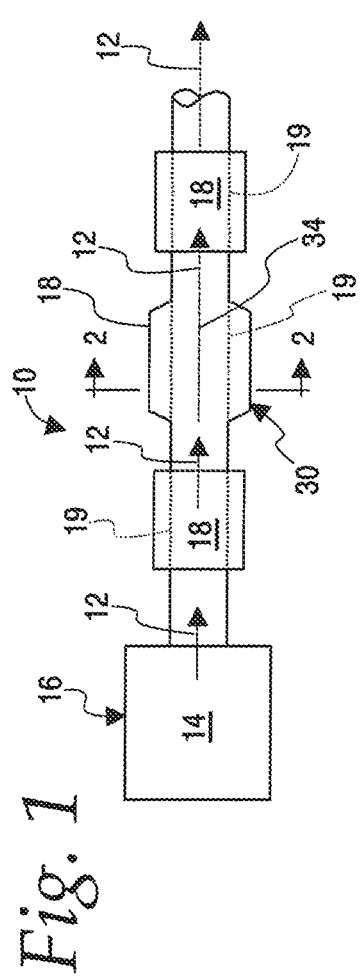
FIG. 1 is a diagrammatic representation of an exhaust gas system employing the invention.

An exhaust gas system 10 is shown in FIG. 1 in the form of a diesel exhaust gas aftertreatment system to treat the exhaust 12 from a diesel combustion process 14, such as a diesel compression engine 16. The exhaust 12 will typically contain oxides of nitrogen ($NO_x$) such as nitric oxide (NO) and nitrogen dioxide ($NO_2$) among others, particulate matter (PM), hydrocarbons, carbon monoxide (CO), and other combustion by-products. The system 10 includes one or more exhaust gas acoustic and/or aftertreatment devices or components 18. Examples of such devices 18 include catalytic converters, diesel oxidation catalysts, diesel particulate filters, gas particulate filters, lean $NO_x$ traps, selective catalytic reduction monoliths, burners, manifolds, connecting pipes, mufflers, resonators, tail pipes, emission control system enclosure boxes, insulation rings, insulated end cones, insulated end caps, insulated inlet pipes, and insulated outlet pipes, all of any cross-sectional geometry, many of which are known. As those skilled in the art will appreciate, some of the foregoing devices 18 are strictly metallic components with a central core 19 through which the exhaust 12 flows, and other of the devices 18 can include a core 19 in the form of a ceramic monolithic structure and/or a woven metal structure through which the exhaust 12 flows. These devices 18 are conventionally used in motor vehicles (diesel or gasoline), construction equipment, locomotive engine applications (diesel or gasoline), marine engine applications (diesel or gasoline), small internal combustion engines (diesel or gasoline), and stationary power generation (diesel or gasoline).

Figure 2:
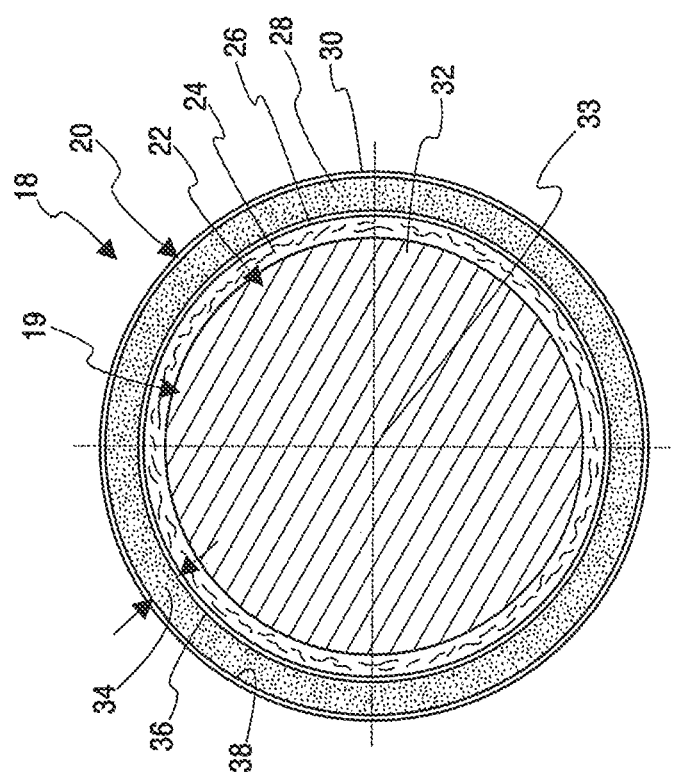
FIG. 2 is a section view of an exhaust system component employing the invention from line 2-2 in FIG. 1.

FIG. 2 shows one example of such a device 18 for use in the system 10 in the form of a catalytic unit 20 having a catalytic core 22 with outer surface 23, a mount 24, a cylindrical inner housing or can 26 having an inner surface 27, a heat insulating blanket or batt 28, and a cylindrical outer housing or jacket 30. The core 22 will typically be a ceramic substrate 32 having a monolithic structure with a catalyst coated thereon and will typically have an oval, circular or other non-round cross section centered on a longitudinal axis 33 with the housing components 26 and 30 also being cylindrical in shape and centered on the axis 33. The mounting mat 24 is sandwiched between the outer surface 23 of the core 22 and the inner surface 27 of the can 26 to help protect the core 22 from shock and vibrational forces that can be transmitted from the can 26 to the core 22.

The heat insulating batt 28 is made of a silica fiber insulation material. Such material is known and commercially available, with one suitable example being supplied by BGF Industries, Inc. under the trade name SilcoSoft®, and another suitable example being supplied by ASGLAWO technofibre GmbH under the trade name Asglasil®. Such material is typically supplied in rolls, with the individual batts 28 being die cut to the appropriate length and width for the corresponding device 18 after the material has been taken from the roll. Preferably, the batt 28 is sandwiched or compressed in the annular gap 34 between the outer surface 36 of the can 26 and the inner surface 38 of the housing 30. This provides sufficient frictional engagement between the batt 28 and the surfaces 36 and 38 to suitably maintain the batt 28 in its desired location. It should be appreciated that while the batt 28 is shown being compressed in the annular gap 34 between the cylindrical can 26 and housing 30, the batt 28 could be compressed between other adjacent surfaces of a device, including for example, a pair of planar adjacent surfaces, a pair of non-planar adjacent surfaces, a pair of conical adjacent surfaces, or any other pair of adjacent surfaces that can be found in acoustic or aftertreatment devices for exhaust systems.

Typically the mounting mat 24 is made of a heat resistant and shock absorbing-type material, such as a mat of glass fibers or rock wool. Such material is typically supplied in rolls, with the individual mounting mat 24 being slit and then cut to the appropriate length and width to define laterally spaced side edges 48, 50 for the corresponding device 18 after the material has been taken from the roll. The side edges 48 and 50 bound the extended surfaces 53 of the mat 24. Preferably, the mounting mat 24 is compressed between the inner surface 27 of the can 26 and the outer surface 23 of the core 22 in order to generate a desired holding force via frictional engagement with the adjacent surfaces 23 and 27.

Referring to FIGS. 3 & 4, pursuant to the instant invention, the first step in installing the mounting mat 24 consists of wrapping the mat 24 about the longitudinal axis 33 of the core 22 so that the mat 24 remains in a constant longitudinal position along the longitudinal axis 33 for at least a complete wrap around the core 22 which allows the mat 24 to evenly set and anchor across the outer surface 23 of the core 22. This first wrap 42 is accomplished by wrapping the mat 24 around the outer surface 23 of core 22 transverse to the longitudinal axis 33 so that the mat 24 is wrapped along a plane (shown by dashed line 43) and is in a constant position relative to the core 22 with the edges 48, 50 of the mat 24 being perpendicular to longitudinal axis 33. FIGS. 3 and 4 show the mounting mat 24, after the first step of rolling the mat around the outer surface 23 of the core 22.

Referring to FIGS. 5 & 6, subsequent to the first wrap, the mat 24 is thereafter wrapped about the longitudinal axis 33, telescopically so that each successive wrap 44 of the mat 24 is offset a predetermined distance 40 from the plane of the previous wrap 44. As shown in FIGS. 5 and 6, the instant embodiment contains three successive wraps 44. It will be appreciated that the structural properties of the mounting mat 24 make it flexible enough to accomplish the flexing associated with mounting the mat 24 telescopically as described. The offset distance 40 is determined based upon the required parameters of the device 10 so that the edges 48 and 50 of the mounting mat 24 in each wrap 44 align in the same plane once the can 26 is installed as described below.

Figure 7:
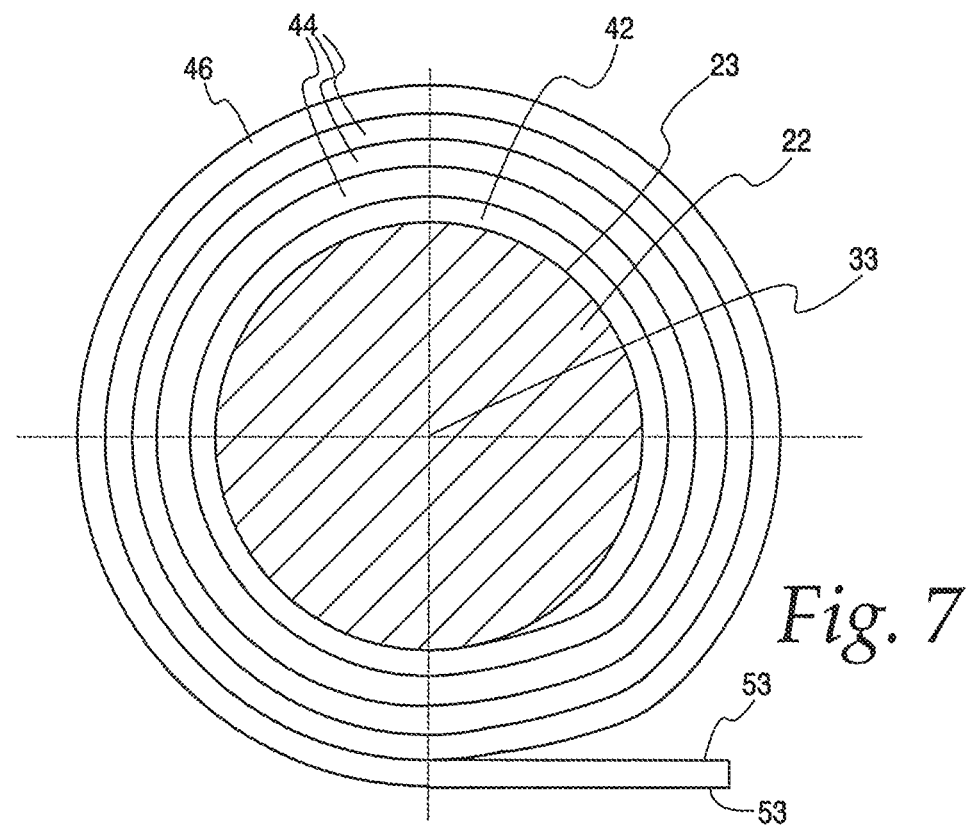
FIG. 7 is a side elevational view of the exhaust system component where the mat has been completely wrapped pursuant to the invention.
Figure 8:
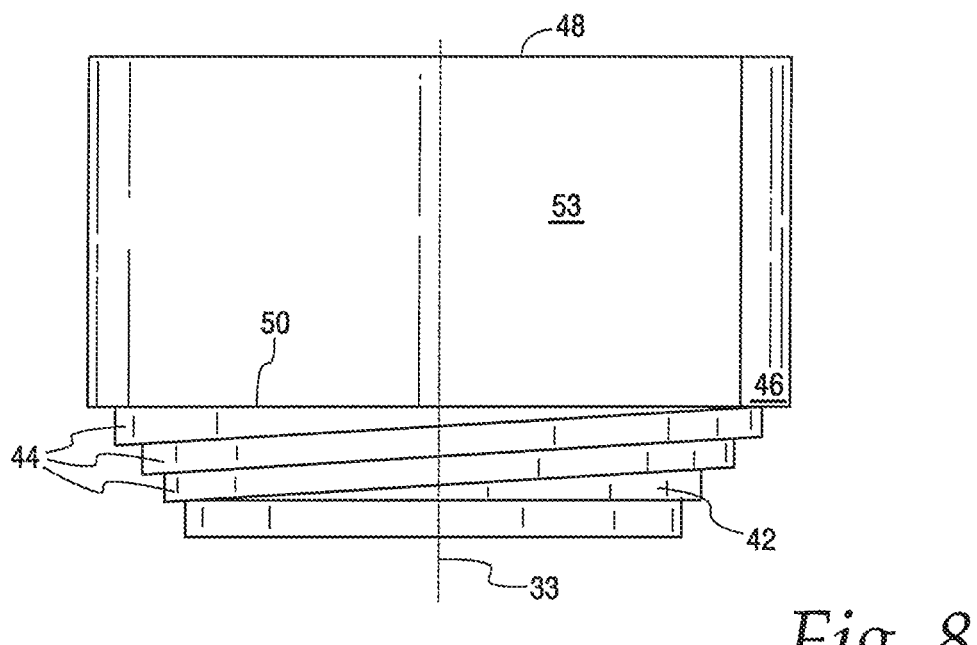
FIG. 8 is a top plan view of the exhaust system component of FIG. 7 where the mat has been completely wrapped pursuant to the invention.

Referring to FIGS. 7 and 8, the final outer wrap 46 of the mounting mat 24 consists of wrapping the mat 24 about the longitudinal axis 33 so that the mat 24 remains in a constant longitudinal position along the longitudinal axis 33 for at least a complete wrap around the core 22 which allows the mat 24 to evenly set and anchor across the inner surface 27 of the can 26 once the can 26 is installed as described below. The final wrap 46 is accomplished by wrapping the mat 24 around the previously wrap 44 of the mat 24 transverse to the longitudinal axis 33 so that the mat 24 is wrapped along a plane parallel to the plane 43.

FIG. 9 shows a cut away of the core 22 and mat 24 before it is installed into the can 26 (not shown). Preferably, the edges 48, 50 of the mat 24 are beveled or cut at a predetermined angle 51 to enable the edges 48, 50 of the mat 24 to be generally planar and normal to the axis 33 once the mat is installed into the can 26 as described below. The angle 51 will be determined based upon the parameters of the specific system and use such as, for example, the specific mat material, the thickness of the mat material, the number of mat wraps, and the desired installed mat density. While the beveling of the edges is preferred, in some applications it may be desirable to forego the beveling and leave the edges 48, 50 square with the extended surfaces of the mat 24.

Referring to FIGS. 10 and 11, once the mounting mat, 24 has been wrapped around the core 22 pursuant to the instant invention, the mounting mat 24 is preferably sandwiched or compressed between the outside surface 23 of core 22 and the inside surface 27 of the can 26. Typically the mounting mat 24 is installed by forcing the mounting mat 24 and core 22 into the can 26 by forcing the length of the mounting mat 24 and core 22 into the can 26 causing a friction fit between the mounting mat 24 and the can 26 as illustrated by arrows 52, 54.

FIG. 12 shows the mounting mat 24 as illustrated in FIG. 10, in which both edges 48, 50 of the mat 24 (including the hidden edges on the right end) are illustrated. The left edge 48 of the first mat wrap 42 of the mat can be seen to be aligned with a first plane 60a which is perpendicular to the longitudinal axis 33 with the right edge 50 of the first wrap 42 aligned with a second plane 60b, also perpendicular to the longitudinal axis 33. The left edge 48 of the final, outer wrap 46 can be seen to be aligned with a third plane 60c, and the right edge 50 of the outer wrap 46 can be seen to be aligned with a fourth plane 60d, with both the third and fourth planes 60c, 60d also being perpendicular to the longitudinal axis 33. The third plane 60c is between the first and second planes 60a, 60b.

During this process the mounting mat 24, un-telescopes as the can 26 is pushed over the mounting mat 24 allowing for a uniform slip of the mounting mat 24 over the core 22. As shown in FIG. 10, this results in a mounting mat 24 which is evenly installed across the same plane over the core 22 without excess mounting mat 24 material loose and hanging over the edges 48, 50 of the mounting mat 24 in the axial direction. In addition, during the installation process, the angle 51 of the side edges 48, 50 is eliminated so that the entire combination of side edges 48, 50 are generally planar along the entire radius of the rolled mat 24.

For illustrative purposes, the core 22, as shown in FIGS. 3-10, and the can 26 as shown in FIG. 10 are both shown as extending past the edges 48, 50 of the mat 24. It will be appreciated that the respective lengths of the core 22 and can 26 can differ and will be determined by the individual application.

It should be appreciated that while the mounting mat 24 is shown being compressed between the cylindrical can 26 and core 22, the mounting mat 24 could be compressed between other adjacent surfaces of a device, including for example, a pair of planar adjacent surfaces, a pair of non-planar adjacent surfaces, a pair of conical adjacent surfaces, or any other pair of adjacent surfaces that can be found in acoustic or aftertreatment devices for exhaust systems. In addition, it should be understood that as used herein and in the claims, the steps described in relation to the mounting mat 24 can equally be applied to installing a batt, blanket or other similar device in an acoustic or aftertreatment device such as the batt 28. Furthermore, it should be understood that the terms batt, blanket and mat are used interchangeably herein and in the claims, with the term "mat" intended to include a "batt" or "a blanket".

It should also be appreciated that while the invention has been described herein in connection with a diesel combustion process in the form of a diesel compression engine 16, the invention may find use in devices that are utilized in exhaust gas systems for other types of combustion processes, including other types of internal combustion engines, including, for example, internal combustion engines that use gasoline or other alternative fuels.

The invention claimed is:

1. A method of installing a mat within an exhaust gas aftertreatment or acoustic device having an inner surface extending in an axial direction and a surrounding outer surface, said inner and outer surfaces being substantially cylindrical and substantially coaxial, the method comprising the steps of:
   completely wrapping the mat a first time around the inner surface, said mat having a width in the axial direction between first and second sides which is substantially said axial length in the axial direction and said first and second sides of said mat first wrap generally lying in first and second planes, respectively, perpendicular to said axis;
   continuing to wrap the mat around itself, said continued wrapping being telescopic such that the first and second sides of each successive wrap of the mat are offset in the axial direction a distance from the first and second sides, respectively, of an underlying wrap of the mat;
   completing wrapping of the mat by wrapping the mat a final time around the outermost telescopic wrap so that the first and second sides of the mat of the final wrap lie in third and fourth planes generally parallel to the first and second planes, wherein said third plane is between said first and second planes; and
   compressing the mat between the inner and outer surfaces while translating the inner and outer surfaces relative to each other in the axial direction wherein the compressing and translating step substantially aligns the sides of all of said wraps of said mats in said first and second planes.

2. The method of claim 1 wherein the inner surface is the outer surface of a core of the device, and the outer surface is the inner surface of a housing surrounding the core after the compressing step.

3. The method of claim 2 wherein the steps of completely wrapping the mat a first time and of completing wrapping of the mat by wrapping a final time each comprise wrapping the mat around the core 360° to 370°.

4. The method of claim 1 wherein the inner and outer surfaces are cylindrical about a central axis extending in the axial direction.

5. The method of claim 1 wherein the mat in the first wrap and the final wrap is generally parallel to an edge of one of the inner and outer surfaces.

6. A method of installing a mat within an exhaust gas aftertreatment or acoustic device having an inner surface extending in an axial direction and a surrounding outer surface, the method comprising the steps of:
   providing a longitudinal mat having a width in the axial direction between longitudinally extending opposite first and second sides;
   wrapping the mat around the inner surface in a longitudinal direction to encircle the inner surface a first time whereby said first and second sides of said mat first wrap generally lie in first and second planes, respectively, perpendicular to said axis;
   continuing to wrap the mat longitudinally around itself wherein said mat is shifted axially in said continued wrapping step such that the first and second sides of each successive wrap of the mat are offset a distance from the first and second sides, respectively, of the underlying wrap of the mat;

wrapping the mat a final time around the inner surface and intervening successive wraps of said mat so that the first and second sides of the mat of the final wrap lie in third and fourth planes, respectively, generally parallel to the first and second planes, wherein said third plane is between said first and second planes; and compressing the mat between the inner and outer surfaces.

7. The method of claim 6, wherein the compressing step comprises translating the inner and outer surfaces relative to each other in the axial direction whereby the wraps are shifted so that the sides of all of said mat wraps are substantially aligned in said first and second planes.

8. The method of claim 6 wherein the initial wrapping step and the final wrapping step comprise wrapping the mat around the longitudinal axis of the device 360° to 370°.

9. The method of claim 6 wherein the inner surface is the outer surface of a core of the device, and the outer surface is the inner surface of a housing surrounding the core after the compressing step.

10. The method of claim 6 wherein the inner and outer surfaces are cylindrical about a central axis extending in the axial direction.

11. The method of claim 6 wherein the mat in the first and final wraps is generally parallel to an edge of one of the inner and outer surfaces.

* * * * *